US011063473B2

(12) United States Patent
Dietzel et al.

(10) Patent No.: US 11,063,473 B2
(45) Date of Patent: Jul. 13, 2021

(54) HANDHELD TOOL CARRYING CASE (71) Applicant: ROBERT BOSCH GMBH, Stuttgart (DE)

(72) Inventors: Friederike Dietzel, Stuttgart (DE); Juergen Mack, Geoppingen (DE); Guenter Lohr, Leinfelden-Echterdingen (DE); Volker Amann, Augsburg (DE); Marcin Rejman, Waiblingen (DE); Brett Huber, Arlington Height, IL (US)

(73) Assignee: ROBERT BOSCH GMBH, Stuttgart (DE)

( * ) Notice: Subject to any disclaimer, the term of this patent is extended or adjusted under 35 U.S.C. 154(b) by 462 days.

(21) Appl. No.: 14/359,552

(22) PCT Filed: Nov. 9, 2012

(86) PCT No.: PCT/EP2012/072289
§ 371 (c)(1),
(2) Date: May 20, 2014

(87) PCT Pub. No.: WO2013/075955
PCT Pub. Date: May 30, 2013

(65) Prior Publication Data
US 2014/0340034 A1    Nov. 20, 2014

(30) Foreign Application Priority Data
Nov. 22, 2011 (DE) .................... 10 2011 086 884.4

(51) Int. Cl.
H02J 50/10 (2016.01)
B25H 3/02 (2006.01)
H02J 7/00 (2006.01)

(52) U.S. Cl.
CPC ............... *H02J 50/10* (2016.02); *B25H 3/02* (2013.01); *B25H 3/022* (2013.01); *H02J 7/0042* (2013.01)

(58) Field of Classification Search
CPC ............. B25H 3/00; B25H 3/02; B25H 3/022
(Continued)

(56) References Cited

U.S. PATENT DOCUMENTS 5,505,328 A * 4/1996 Stribiak ................. A01K 97/06
206/315.11
8,646,600 B2 * 2/2014 Amatrudo .............. B25H 3/006
206/373
(Continued)

FOREIGN PATENT DOCUMENTS

CN        2799189 Y     7/2006
CN      101622106 A     1/2010
(Continued)

OTHER PUBLICATIONS

International Search Report for PCT/EP2012/072289, dated Jun. 5, 2013.

*Primary Examiner* — Robert Grant
(74) *Attorney, Agent, or Firm* — Norton Rose Fulbright Us LLP; Gerard Messina (57) ABSTRACT A handheld tool carrying case includes at least one interior structuring unit having at least one interior structuring element, which is provided to delimit at least one inductive charge receiving region for at least one handheld tool battery. The interior structuring unit is configured to be combinable in a modular manner.

21 Claims, 4 Drawing Sheets (58) Field of Classification Search
USPC .......................................... 206/349; 320/108
See application file for complete search history.

(56) References Cited

U.S. PATENT DOCUMENTS

| | | | |
|---|---|---|---|
| 2005/0098403 A1* | 5/2005 | McIntyre | A45C 5/04 190/110 |
| 2006/0027557 A1 | 2/2006 | Peterson et al. | |
| 2006/0169690 A1* | 8/2006 | Rothschild | A45C 7/0036 220/7 |
| 2008/0035507 A1 | 2/2008 | Collister et al. | |
| 2009/0212737 A1* | 8/2009 | Johnson | A47B 96/02 320/108 |
| 2012/0273377 A1* | 11/2012 | Amatrudo | B25H 3/021 206/373 |
| 2012/0305417 A1* | 12/2012 | Yoshida | A45D 33/008 206/235 |

FOREIGN PATENT DOCUMENTS

| | | |
|---|---|---|
| CN | 201471421 U | 6/2010 |
| CN | 101947774 A | 1/2011 |
| CN | 102077304 A | 5/2011 |
| CN | 201889788 U | 7/2011 |
| CN | 201895325 U | 7/2011 |
| CN | 202037599 U | 11/2011 |
| DE | 10 2005 062997 | 7/2007 |
| KR | 2011 0107728 | 10/2011 |

* cited by examiner

HANDHELD TOOL CARRYING CASE

BACKGROUND OF THE INVENTION

1. Field of the Invention

The present invention relates to a handheld tool carrying case having an interior structuring unit.

2. Description of the Related Art

A carrying case for a handheld tool having at least one interior structuring unit which includes at least one interior structuring element to delimit at least one inductive charge receiving region for at least one handheld tool battery, has already been proposed.

BRIEF SUMMARY OF THE INVENTION

The invention is based on a carrying case for a handheld tool having at least one interior structuring unit, which includes at least one interior structuring element provided to delimit at least one inductive charge receiving region for at least one handheld tool battery.

The interior structuring unit is to be developed as combinable in a modular manner. An "interior structuring unit" in particular means a unit that is provided to subdivide an interior space of a handheld tool carrying case into subsections. The subsections in particular are provided to accommodate at least one handheld tool battery and/or a handheld tool. The interior structuring unit preferably includes at least two interior structuring elements. An "interior structuring element" in particular means an element that covers maximally 95%, in particular maximally 80%, advantageously maximally 60%, especially advantageously maximally 40%, of a base area of an interior space of the tool carrying case. The interior structuring element in particular is developed in the shape of a grid and/or raster and/or at least partially as a transparent element. An interior structuring element in particular differs from a component which is provided to delimit both an inductive charge receiving region of a handheld tool battery, especially one coupled to a handheld tool and/or integrated into a handheld tool, and an inductive charge receiving region of a handheld tool battery, which is provided as a replacement battery, in particular. Developments having at least two interior structuring elements for separate handheld tool batteries, and at least one interior structuring element for at least one handheld tool are conceivable as an alternative.

An "inductive charge receiving region" in particular means a receiving region of the handheld tool carrying case that is provided to accommodate at least one handheld tool battery and to facilitate inductive charging of a handheld tool battery placed in the inductive charge receiving region. In particular, the inductive charge receiving region is provided to enable charging of the handheld tool battery at an efficiency of at least 70%, especially at least 80%, advantageously at least 90%, preferably at least 95%. The inductive charge receiving region in particular allows inductive recharging of the handheld tool battery through the wall of the handheld tool carrying case. Specifically, the inductive charge receiving region is provided to accommodate a handheld tool battery which is mechanically connected to a handheld tool and/or is integrated in a handheld tool. Housing parts of the handheld tool carrying case are preferably made of an insulating material, at least in an area close to the inductive charge receiving region, so that losses in the energy transmission by induction are able to be kept low. "Provided" in particular means specially configured and/or equipped. The expression that a handheld tool battery is provided to be charged "inductively" in particular means that the handheld tool battery includes at least one charge coil. The handheld tool battery has at least one coupling point for connecting the handheld tool battery to a handheld tool in a mechanical and/or electrical manner. It would alternatively be conceivable to integrate the handheld tool battery in a handheld tool. The coupling point is part of a snap-in and/or rotary mechanism, in particular.

A charge coil in particular means a coil having at least one coiled, especially wound, electrical conductor, and/or an electrical conductor formed on a circuit board; the coil is provided to transmit energy and/or preferably receive energy for charging and/or discharging of especially at least one energy storage unit, preferably an electromechanical energy store unit, of the handheld tool battery in at least one operating state. The charge coil is preferably provided to convert an electrical alternating current into a magnetic alternating field and/or vice versa. In particular, the charge coil is to supply received energy directly to a consumer, especially via a voltage transformer.

A system having a handheld tool battery and a charger and/or a handheld tool preferably has at least two charge coils, which are adapted to one another and may be physically separated by a user; in at least one operating state, at least one charge coil is provided to generate a magnetic alternating field which induces an electrical alternating current in at least one further charge coil. The handheld tool battery in particular includes electronics for converting an alternating current induced in the charge coil into a DC current which is storable in the energy storage unit, and/or for converting a direct current received from the energy storage unit into an alternating current for the supply of the charge coil and for the transmission of energy to a corresponding charge coil. Further refinements in particular are conceivable, in which the handheld tool carrying case has an induction coupling unit, which is formed by at least two electrically interconnected charge coils and provided to receive energy from a corresponding charge station via one of the charge coils, and to transmit energy to a handheld tool battery placed in the inductive charge receiving region via the other charge coil. The inductive charge receiving region is preferably situated in an area that is near a wall of the handheld tool carrying case, so that direct charging of the handheld tool battery through the wall is possible.

The expression "combinable in a modular manner" in particular means that at least one component of the interior structuring unit, especially a base element, is designed to be combined with different variants of components of at least one other component of the interior structuring unit, especially an interior structuring element. The components in particular have positioning aids, which prevent sliding of the components, especially once the interior structuring element has been inserted into the tool carrying case, or after the interior structuring element has been combined with the interior structuring unit. It is conceivable, in particular, that multiple interior structuring elements fixate each other in their individual positions. Greater flexibility, especially with regard to the size of the handheld tool battery, is able to be achieved, which makes it possible to obtain greater efficiency in an inductive charge operation of the handheld tool battery, especially by a low clearance between corresponding charge coils. Moreover, increased flexibility in a production of the handheld tool carrying case is obtainable, during which base components, especially housing components, of the handheld tool carrying case are able to be produced independently of developments of a handheld tool battery and/or handheld tool later to be stored therein. Costs are able to be reduced, in particular.

In one advantageous further development, the interior structuring element is designed in such a way that at least no tools are necessary for an installation with regard to the interior structuring unit. An object "to be assembled without tools" in particular describes an object which an operator can connect to at least one part of the tool carrying case, especially a base element of the interior structuring unit, especially without the use of objects, such as tools, in particular, that are not coupled to the handheld tool carrying case. The interior structuring element is advantageously provided as a clamping and/or snap-in connection. A "clamping connection" in particular describes a connection in which a connecting motion of an element to be connected, relative to a base element produces forces that are at least essentially oriented perpendicular to a direction of the connecting motion and result in a frictional connection. A "snap-in connection" in particular means a connection in which a connecting motion brings about an excursion and/or a snap-back travel of a spring element and a keyed connection is established in the connection direction. The interior structuring element is provided for a permanent connection to the base element, in particular, which leads to increased precision in the positioning of a handheld tool battery, which is advantageous in an inductive charge operation through an underside of the handheld tool carrying case, in particular. As an alternative, it is conceivable that the interior structuring element is meant to be connected to the interior structuring unit in a welding operation, and/or that the interior structuring element is connected to the interior structuring unit by a welding operation.

It is advantageously provided that the interior structuring element is detachable from the interior structuring unit without the use of tools. An object that is "detachable without the use of tools" means that an operator can remove the object from the handheld tool carrying case without using objects, especially tools, that are not coupled to the handheld tool carrying case. In particular, the interior structuring element is provided for a connection, releasable without tools, to at least one part of the handheld tool carrying case. A connection releasable without using tools, in particular is able to be produced and released repeatedly, especially without adding material when establishing the connection, and/or without removing essential quantities, especially more than 1%, of material during the release process. The interior structuring element is provided to be removed together with a base element of the interior structuring unit, in particular. This makes it possible to achieve high flexibility, in particular.

It is furthermore proposed that the interior structuring unit has at least one base element for positioning the interior structuring element. The base element is developed as a grid structure and/or as a raster, in particular, advantageously in the form of a plate. In particular, the base element is to be removed from the handheld tool carrying case without using tools. The interior structuring element, in particular, is provided to be snapped into place between braces of the base element and/or in locating depressions of the base element. As an alternative, the handheld tool carrying case has at least one housing part which is integrally formed with the base element. "Integrally formed" in particular means intermaterially connected, e.g., by a welding process and/or bonding process etc., and especially advantageously, premolded, e.g., by the production from one cast and/or by the production using a one-component or multi-component injection molding process. The base element in particular has at least two fixation positions to secure the at least one interior structuring element. In particular, the fixation position has at least one means for a keyed and/or frictional connection, which is provided to correspond to at least one frictional connection and/or keyed connection means of the interior structuring element. This makes it possible to achieve greater flexibility, in particular.

It is furthermore provided that the base element is formed by at least one space divider element. A "space divider element" in particular is an object, especially a wall, a grid and/or a rod, which is provided to subdivide at least a portion of a space into two parts. The space divider element is preferably disposed essentially perpendicular to an underside of the handheld tool carrying case. An "underside" of the handheld tool carrying case in particular means a side that lies opposite from a housing part developed as a cover. The underside in particular is situated at least essentially perpendicular to a height of the handheld tool carrying case. A "height" in particular means a direction in which the dimension of the handheld tool carrying case is minimal. "Essentially perpendicular" in particular denotes an angle that deviates from 90° by less than 30°, especially by less than 15°, advantageously by less than 5°, preferably less than 1°. The space divider element is at least essentially disposed in parallel with a plane, in particular. The expression that an object is disposed "essentially in parallel with a plane" in particular means that at least 50%, in particular at least 70%, advantageously at least 90%, preferably at least 95% of the object has a clearance from the plane that is less than 3 cm, in particular less than 2 cm, advantageously less than 1 cm, preferably less than 0.5 cm. A curved and/or bent space divider element is alternatively conceivable as well. The base element in particular is formed by multiple space divider elements, which are preferably developed in one piece, the base element preferably forming a supporting framework. The interior structuring element in particular is provided to be adjusted in its position on a base element designed as a supporting framework in a continuously variable manner. An uncomplicated construction and/or operation are/is achievable, in particular.

It is furthermore provided that the interior structuring element is to be used for a plug-in connection. A plug-in connection in particular is a clamping and/or snap-in connection, which requires only a linear connecting motion for its production and/or reversal. As an alternative, developments are conceivable in which the clamping and/or snap-in connection is intended to be produced and/or released by a rotary and/or tilting motion. Simple handling is able to be achieved, in particular.

Furthermore, it is proposed that the interior structuring element be developed as a space divider element. In particular, the interior structuring element developed as a space divider element is meant to be positioned at a right angle to at least one space divider element of the base element. Simple handling is able to be achieved, in particular.

The at least one interior structuring element is advantageously developed as a bowl. The fact that the interior structuring element is developed as a "bowl" in particular means that the interior structuring element is designed as a base element which is shaped to support a certain object, preferably at least one handheld tool battery. Secure support is able to be achieved, in particular.

It is furthermore provided that the interior structuring element is to be processed by an operator in order to adapt it to an object to be inserted. In particular, the interior structuring element is at least essentially developed as a paraellepiped block. Specifically, the interior structuring element has prefabricated setpoint rupture joints that allow parts of the interior structuring element to be removed. The interior structuring element is made of a cuttable material, in particular, especially a foam material, and intended to be cut into a shape by an operator that is suitable for an object to be inserted. High flexibility, especially with regard to handheld tools and/or handheld tool batteries to be inserted, is achievable, in particular.

Furthermore, a system is provided, which includes at least one handheld tool carrying case and at least two different interior structuring elements, which are specifically intended as support for handheld tools and/or handheld tool batteries of different designs, especially different sizes. One of the two interior structuring elements is meant to be placed in the tool carrying case, in particular to be connected thereto, especially permanently and preferably without tools, especially during the production of the handheld tool case, as a function of a handheld tool and/or a handheld tool battery to be inserted. The system preferably has a multitude of interior structuring elements to accommodate handheld tools, and a multitude of interior structuring elements to accommodate handheld tool batteries; when configuring a handheld tool carrying case, at least one interior structuring element is selected for a handheld tool battery and/or at least one interior structuring element is selected for a handheld tool, and the interior structuring elements are permanently and/or releasably connected to the tool carrying case, especially in a position that is suitable for facilitating an inductive charging operation. A "permanent connection" in particular means a connection that is provided to be released only with the aid of tools that are not coupled to the tool carrying case. A permanent connection is formed by an intermaterial connection, in particular, especially a welding process.

DETAILED DESCRIPTION OF THE INVENTION

Figure 1:
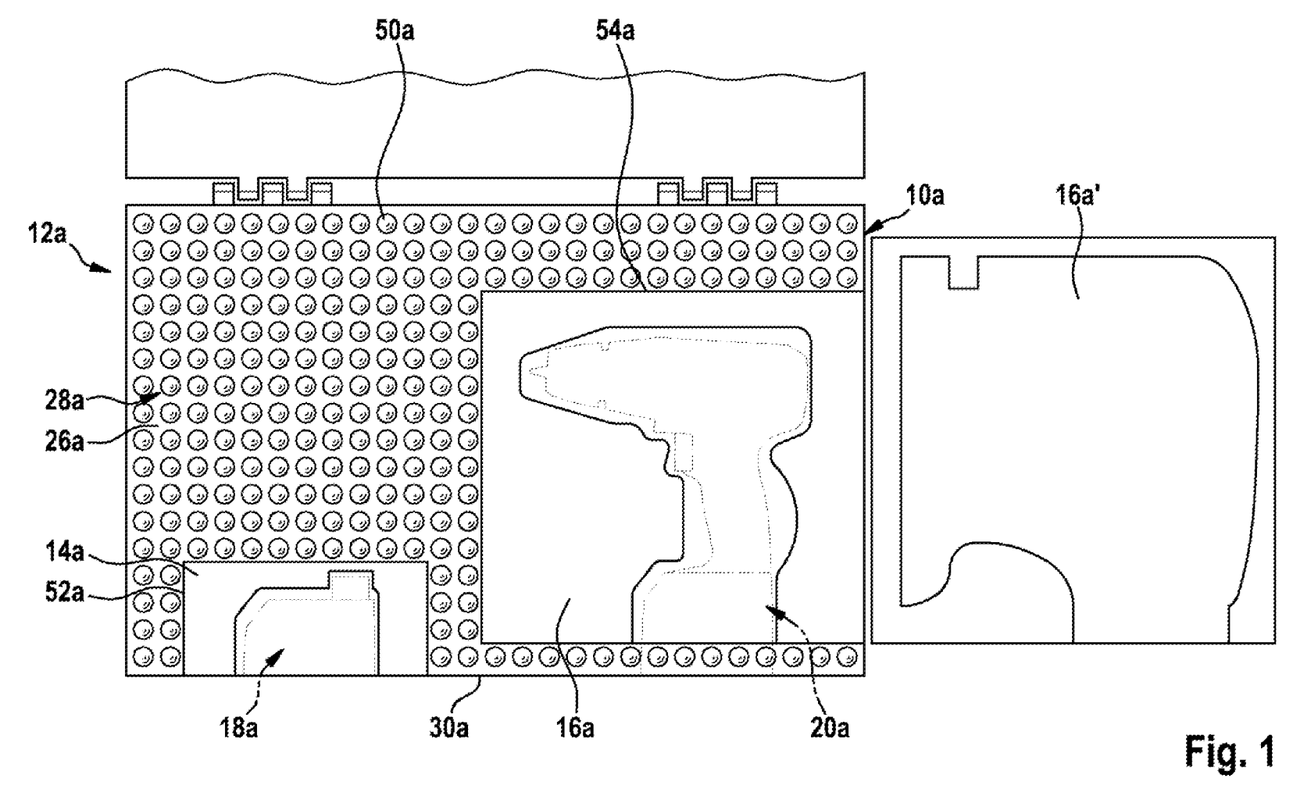
FIG. 1 shows in a schematic illustration, a handheld tool carrying case according to the present invention in an open state, from above.

FIG. 1 shows a handheld tool carrying case 10a having an interior structuring unit 12a provided with two interior structuring elements 14a, 16a. Interior structuring unit 12a is designed to be combinable in a modular manner. Interior structuring elements 14a, 16a are provided to delimit an inductive charge receiving region 18a, 20a for a handheld tool battery (only sketched) in each case. Interior structuring elements 14a, 16a are designed to be able to be installed in and removed from interior structuring unit 12a without using tools. Interior structuring unit 12a furthermore has a base element 26a for the positioning of interior structuring elements 14a, 16a. Base element 26a has nubs 50a, which provide fixation positions for a lateral fixation of interior structuring elements 14a, 16a. Nubs 50a are disposed in a regular right-angled raster pattern. The centers of two adjacent nubs 50a have a clearance of 10 mm in each case. Nubs 50a have a height of 2 mm. Handheld tool carrying case 10a includes a housing part 28a which forms an underside of handheld tool carrying case 10a. Housing part 28a is integrally formed with base element 26a. Interior structuring elements 14a, 16a are developed in the form of bowls. Interior structuring element 14a is meant to support a handheld tool battery which is to be charged in an inductive manner. Interior structuring element 16a is designed to support a handheld tool to which a handheld tool battery is coupled, which is to be charged inductively. One side of interior structuring elements 14a, 16a developed in the shape of a bowl has an open design, so that an inserted handheld tool battery is able to rest directly against a wall 30a of handheld tool carrying case 10a. Interior structuring element 14a is positioned directly on wall 30a in this case and provided for a small handheld tool battery. Interior structuring element 16a is positioned at a distance from wall 30a in order to accommodate a handheld tool having a large-sized coupled handheld tool battery. Interior structuring elements 14a, 16a may be removed without tools for an adaptation to handheld tool batteries of different sizes and be reinserted at another position that is predefined by nubs 50a. Interior structuring elements 14a, 16a are provided with edges 52a, 54a for this purpose, which are to meant to be positioned between nubs 50a and to be secured by them in order to prevent lateral slippage. Large handheld tool batteries project beyond interior structuring element 14a, 16a.

As an alternative or in addition to edges 52a, 54a, at least one depression, preferably at least two depressions, may be provided on interior structuring elements 14a, 16a, to accommodate nubs 50a and/or to lock into place with them and/or lock together with them.

As an alternative, the clearances between center points of nubs 50a may also assume different values, especially values between 5 mm and 20 mm. Other heights of nubs 50a, especially between 1 mm and 5 mm, are conceivable as well.

FIG. 1 furthermore shows a system which includes handheld tool carrying case 10a and two different interior structuring elements 16a, 16a'; depending on a handheld tool to be inserted, one of the two interior structuring elements 16a, 16a' is designed to be placed in handheld tool carrying case 10a. Interior structuring elements 16a, 16a' are developed in the form of bowls. This enables an operator to select a suitable interior structuring element 16a, 16a' for a handheld tool to be carried.

Moreover, interior structuring element 16a' may be part of a system which includes a handheld tool and is meant to be sold together therewith.

It may furthermore be the case that a handheld tool and/or a handheld tool battery with an interior structuring element that is suitably shaped as a bowl and provided to correspond to handheld tool carrying case 10a, is offered in a system, so that obtain optimal positioning of the handheld tool and/or the handheld tool battery is achieved. It may furthermore be possible that an identical handheld tool carrying case is suitable for different handheld tools and/or handheld tool batteries when using different interior structuring elements.

Figure 2:
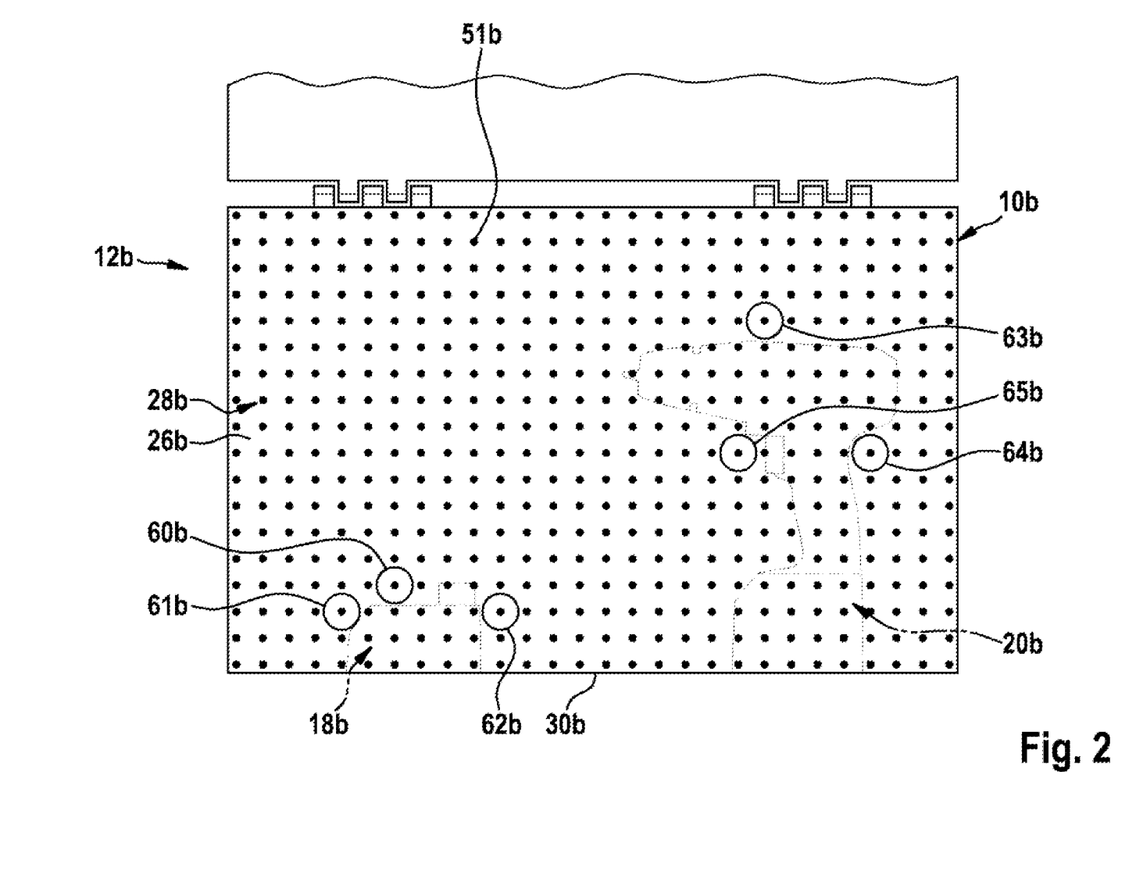
FIG. 2 shows an alternative handheld tool carrying case according to the present invention.
Figure 3:
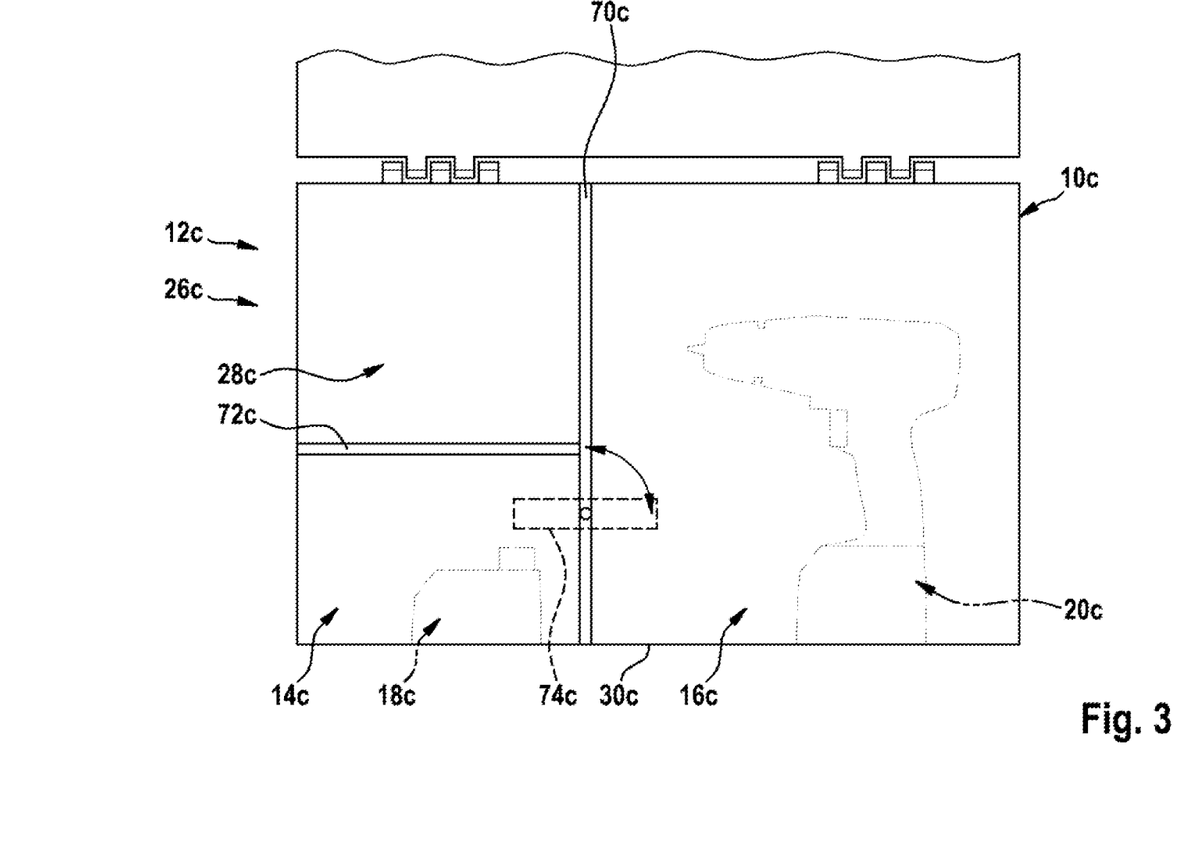
FIG. 3 shows a third handheld tool carrying case according to the present invention.

FIGS. 2 and 3 show a further exemplary embodiment of the present invention. The following descriptions and the figures are essentially limited to the differences between the exemplary embodiments. Regarding components that are designated in the same way, particularly with regard to components having identical reference numerals, it is fundamentally possible to refer also to the figures and/or the description of the other exemplary embodiments, especially FIG. 1. In order to distinguish the exemplary embodiments, the letter a has been added after the reference numerals of the exemplary embodiment in FIG. 1. In the exemplary embodiments of FIGS. 2 through 3, the letter a has been replaced by the letters b or c.

FIG. 2 shows another handheld tool carrying case 10b having an interior structuring unit 12b that includes six interior structuring elements 60b, 61b, 62b, 63b, 64b, 65b. Interior structuring elements 60b, 61b, 62b, 63b, 64b, 65b are developed as space divider elements. Interior structuring elements 60b, 61b, 62b, 63b, 64b, 65b are developed as pegs. Interior structuring elements 60b, 61b, 62b, 63b, 64b, 65b are provided to be installed or released without using tools. Interior structuring elements 60b, 61b, 62b, 63b, 64b, 65b are intended for a plug-in connection. For this purpose, each interior structuring element 60b, 61b, 62b, 63b, 64b, 65b has a locking head which is to be inserted into locating recesses 51b of a base element 26b of interior structuring unit 12b. Locating recesses 51b are situated in base element 26b in a dense grid pattern, similar to the proposed grid pattern of nubs 50a. By repositioning interior structuring elements 60b, 61b, 62b, 63b, 64b, 65b on base element 26b, handheld tool carrying case 10b is able to be adapted to different sizes of handheld tools and/or handheld tool batteries. This ensures that the handheld tool batteries rest against a wall 30b of handheld tool carrying case 10b, so that efficient inductive charging is enabled. On the inside of wall 30b, there are markings that indicate an optimum position for an inductive charging operation with the aid of a corresponding charger.

As an alternative, developments are conceivable in which base element 26b is formed by polymeric foam and interior structuring elements 60b, 61b, 62b, 63b, 64b, 65b have piercing tips which are designed to secure interior structuring elements 60b, 61b, 62b, 63b, 64b, 65b by piercing the polymeric foam. Such a development provides cushioning at the same time. In addition, further developments are conceivable, in which interior structuring elements 60b, 61b, 62b, 63b, 64b, 65b designed as pegs are secured in holes in base element 26b.

Moreover, developments are conceivable in which interior structuring elements 60b, 61b, 62b, 63b, 64b, 65b are designed as walls or grids. Base element 26b may also have clamping heads on which interior structuring elements 60b, 61b, 62b, 63b, 64b, 65b are placed.

As an alternative, interior structuring elements 60b, 61b, 62b, 63b, 64b, 65b in the form of pegs may be provided to be screwed into threaded holes of the base element.

FIG. 3 shows a third handheld tool carrying case 10c which includes an interior structuring unit 12c. Interior structuring unit 12c has a base element 26c, which is formed by two space divider elements 70c, 72c. Space divider elements 70c, 72c subdivide an interior space of handheld tool carrying case 10c into three subsections. One interior structuring element 14c is disposed in a first subsection and designed to accommodate a handheld tool battery. One interior structuring element 16c is situated in a second subsection and designed to accommodate a handheld tool. Interior structuring elements 14c, 16c are provided to be processed by an operator so as to adapt them to an object to be placed inside them. Interior structuring elements 14c, 16c are formed by polymeric foam and provided with perforations in order to adapt them to handheld tools of different sizes and/or handheld tool batteries of different sizes. Interior structuring elements 14c, 16c are to be inserted into the subsections. They are provided to be installed and released without the use of tools. Interior structuring elements 14c, 16c shaped in this way form bowls.

In addition, a locking mechanism 74c may be disposed on base element 26c, which secures interior structuring elements 14c, 16c in the subsections to prevent them from falling out. For example, this locking mechanism 74c may be a lever, which is disposed at an upper edge of at least one of space divider elements 70c, 72c in a manner that allows it to rotate. For the opening, the lever is positioned in parallel with space divider element 70c, 72c, and for the closing, it is positioned at a right angle thereto. Locking mechanism 74c in particular is to engage with keyed connection elements of interior structuring elements 14c, 16c and/or to dig into interior structuring elements 14c, 16c.

Furthermore, additional interior structuring elements, e.g., for storing tool means, especially drills and/or screw adapters, and/or storage boxes for tool means or for accommodating another spare battery, are conceivable, which are to be placed in interspaces and/or free spaces, e.g., in the third subsection of the exemplary embodiment of FIG. 3.

In addition, it is possible that interior structuring elements 14a, 16a, 60b-65b, 14c, 16c are to be permanently connected to handheld tool carrying case 10a, 10b, 10c, especially bonded and/or welded, in particular during a production process of the handheld tool carrying case.

Figure 4:
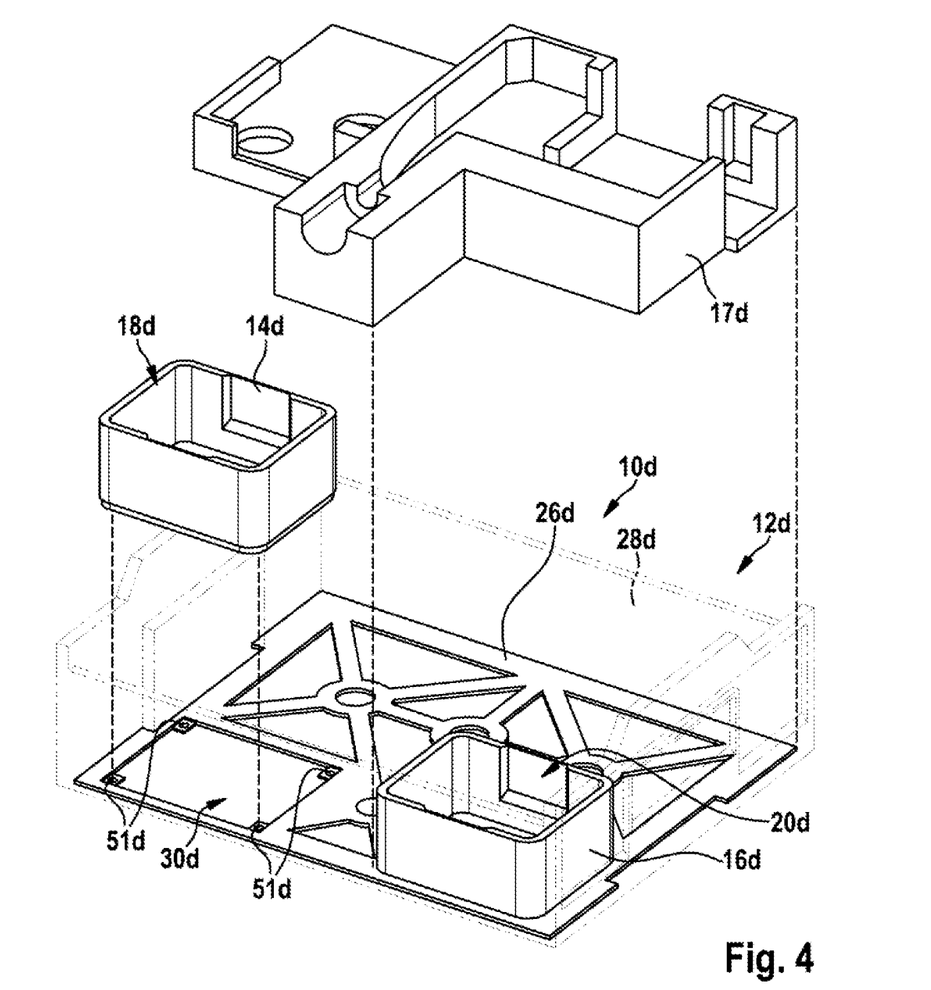
FIG. 4 shows a fourth handheld tool carrying case according to the present invention.

FIG. 4 shows a handheld tool carrying case 10d provided with an interior structuring unit 12d. Interior structuring unit 12d is designed to be combinable in a modular manner. Interior structuring unit 12d includes a base element 26d, which is developed as an injection-molded part and structured in the form of a grid. Base element 26d has multiple braces, which are used as fixation points for interior structuring elements 17d. In addition, base element 26d has two essentially rectangular recesses, at whose corner points locating depressions 51d are provided. They form two fixation positions for interior structuring elements 14d, 16d. Interior structuring unit 12d has two interior structuring elements 14d, 16d, which are intended to delimit inductive charge receiving regions 18d, 20d for a handheld tool battery. Handheld tool batteries placed in inductive charge receiving regions 18d, 20d are designed to be inductively charged through a wall 30d, formed as bottom side, of a housing part 28d of handheld tool carrying case 10d developed in the shape of a bowl. Interior structuring elements 14d, 16d are meant to lock into place in locating depressions 51d. During the production, interior structuring elements 14d, 16d are inserted on top of base element 26d. Interior structuring elements 14d, 16d are designed as bowls having an opening that is open toward the underside, so that an inserted handheld tool battery rests against wall 30d of handheld tool carrying case 10d. Base element 26d is designed as a flat body having a height of 0.5 cm. Base element 26d covers 50% of the surface area of handheld tool carrying case 10d or housing part 28d. With regard to its outline or its lateral shape, base element 26d establishes a keyed connection with housing part 28d. Base element 26d is meant to lock into place with housing part 28d. For other handheld tool batteries, additional interior structuring elements are provided, which are adapted to their shape and are able to be connected to the same base element 26d. The snap-in connections between base element 26d and interior structuring elements 14d, 16d ensure an exact positioning via the essentially rectangular recesses of base element 26d. In addition, an interior structuring element 17d is provided to accommodate a handheld tool which can be coupled to handheld tool batteries able to be placed in inductive charge receiving regions 18d, 20d for an inductive charging operation. Interior structuring element 17d is furthermore designed to accommodate a charger. Interior structuring element 17d is produced in a deep-drawing process; it is designed to be placed in handheld tool carrying case 10d and to be secured by interior structuring elements 14d, 16d as well as by the structuring of base element 26d. Different interior structuring elements, which are able to be combined with base element 26d, are provided for different handheld tools. Interior structuring elements 14d, 16d are connectable to base element 26d without the use of tools, but they require tools to be detached from base element 26d. No tools are required to release base element 26d together with interior structuring elements 14d, 16d from handheld tool carrying case 10d, and no tools are needed to position interior structuring element 17d in handheld tool carrying case 10d or to remove it from there. Interior structuring element 17d differs from an interior structuring element provided to accommodate a handheld tool battery.

In one further development, base element 26d is integrally formed with housing part 28d, e.g., welded to it or produced from one piece.

What is claimed is:

1. A handheld tool carrying case, comprising:
at least one interior structuring unit having at least one interior structuring element which is provided to delimit at least one inductive charge receiving region for at least one handheld tool battery, wherein the at least one interior structuring unit is configured to be combinable in a modular manner,
wherein the interior structuring element is configured as a bowl and provided for at least one of a clamping or snap-in connection with at least one base element of the at least one interior structuring unit,
wherein the base element includes at least one depression situated at at least one corner of the base element
wherein the interior structuring element is configured to clamp or snap-in to the at least one base element in the at least one depression,
wherein the at least one base element includes nubs disposed in a right-angled raster pattern and which provide fixation positions for a lateral fixation of the at least one interior structuring element.

2. The handheld tool carrying case as recited in claim 1, wherein the at least one interior structuring element is configured to be installable without tools with regard to the interior structuring unit.

3. The handheld tool carrying case as recited in claim 2, wherein the at least one interior structuring element is configured to be removable from the at least one interior structuring unit without using tools.

4. The handheld tool carrying case as recited in claim 1, wherein the at least one base element is configured for positioning the interior structuring element.

5. The handheld tool carrying case as recited in claim 4, wherein the base element includes at least two fixation positions for securing the at least one interior structuring element.

6. The handheld tool carrying case as recited in claim 4, further comprising:
at least one housing part which is integrally formed with the base element.

7. The handheld tool carrying case as recited in claim 4, wherein the base element is formed by at least one space divider element.

8. The handheld tool carrying case as recited in claim 4, wherein the interior structuring element is configured as a space divider element.

9. The handheld tool carrying case as recited in claim 4, wherein the interior structuring element is configured to be processed by an operator in order to adapt the interior structuring element to an object to be placed in the interior structuring element.

10. A system comprising:
a handheld tool carrying case including at least one interior structuring unit; and
an interior structuring element configured to be modularly combined with the handheld tool carrying case,
wherein the interior structuring element is configured as a bowl and provided for at least one of a clamping or snap-in connection with at least one base element of the at least one interior structuring unit,
wherein the base element includes at least one depression situated at at least one corner of the base element
wherein the interior structuring element is configured to clamp or snap-in to the at least one base element in the at least one depression,
wherein the at least one base element includes nubs disposed in a right-angled raster pattern and which provide fixation positions for a lateral fixation of the at least one interior structuring element.

11. A system comprising:
at least one handheld tool battery configured to be inductively charged;
a handheld tool;
a handheld tool carrying case; and
at least one interior structuring element configured to be modularly combined with the handheld tool carrying case,
wherein the at least one interior structuring element is configured as a bowl and provided for at least one of a clamping or snap-in connection with the handheld tool carrying case,
wherein the base element includes at least one depression situated at at least one corner of the base element
wherein the interior structuring element is configured to clamp or snap-in to the at least one base element in the at least one depression,
wherein the at least one base element includes nubs disposed in a right-angled raster pattern and which provide fixation positions for a lateral fixation of the at least one interior structuring element.

12. The system as recited in claim 11, wherein at least two different interior structuring elements are provided, and wherein, depending on at least one of the handheld tool and the handheld tool battery to be inserted, one of the at least two interior structuring elements is provided to be placed in the handheld tool carrying case.

13. The handheld tool carrying case as recited in claim 1, wherein the at least one inductive charge receiving region is configured to accommodate the at least one handheld tool battery for inductive recharging.

14. The handheld tool carrying case as recited in claim 1, wherein the at least one inductive charge receiving region is configured to accommodate the at least one handheld tool battery for inductive recharging through a wall of the handheld tool carrying case.

15. The handheld tool carrying case as recited in claim 1, wherein the bowl has a side wall having an opening such that the handheld tool battery accommodated in the bowl rests directly against a wall of the handheld tool carrying case.

16. The handheld tool carrying case as recited in claim 1, wherein the bowl has one bottom wall which is embodied as an open bottom wall such that the handheld tool battery accommodated in the bowl rests directly against a wall of the handheld tool carrying case.

17. A handheld tool carrying case, comprising:
at least one interior structuring unit having at least one interior structuring element which is provided to delimit at least one inductive charge receiving region for at least one handheld tool battery, wherein the at least one interior structuring unit is configured to be combinable in a modular manner,
wherein the interior structuring unit has at least one base element for positioning the interior structuring element,
wherein the interior structuring element is configured as a bowl and the at least one base element includes nubs that provide at least two fixation positions for positioning the bowl in two different positions relative to a wall of the handheld tool carrying case, wherein the nubs are disposed in a right-angled raster pattern.

18. The handheld tool carrying case as recited in claim 17, wherein the at least one inductive charge receiving region is configured to accommodate the at least one handheld tool battery for inductive recharging.

19. The handheld tool carrying case as recited in claim 17, wherein the at least one inductive charge receiving region is configured to accommodate the at least one handheld tool battery for inductive recharging through a wall of the handheld tool carrying case.

20. The handheld tool carrying case as recited in claim 17, wherein the bowl has a side wall having an opening such that the handheld tool battery accommodated in the bowl rests directly against a wall of the handheld tool carrying case.

21. The handheld tool carrying case as recited in claim 17, wherein the bowl has one bottom wall which is embodied as an open bottom wall such that the handheld tool battery accommodated in the bowl rests directly against a wall of the handheld tool carrying case.

* * * * *